US011412447B2

United States Patent
Malherbe et al.

(10) Patent No.: US 11,412,447 B2
(45) Date of Patent: Aug. 9, 2022

(54) DEVICES AND METHODS FOR CONTROLLING BASE STATIONS OF A COMMUNICATION NETWORK

(71) Applicant: Huawei Technologies Co., Ltd., Shenzhen (CN)

(72) Inventors: Emmanuel Malherbe, Munich (DE); Aladin Virmaux, Munich (DE); Symeon Chouvardas, Munich (DE); Moez Draief, Munich (DE)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/945,016

(22) Filed: Jul. 31, 2020

(65) Prior Publication Data
US 2020/0389846 A1 Dec. 10, 2020

Related U.S. Application Data

(63) Continuation of application No. PCT/EP2018/052396, filed on Jan. 31, 2018.

(51) Int. Cl.
*H04W 52/02* (2009.01)
*H04W 28/02* (2009.01)

(52) U.S. Cl.
CPC ... *H04W 52/0206* (2013.01); *H04W 28/0289* (2013.01)

(58) Field of Classification Search
CPC ............ H04W 28/0289; H04W 40/10; H04W 52/0206; H04W 52/02; H04W 28/02; H04W 28/08; H04W 36/16; Y02D 30/70
See application file for complete search history.

(56) References Cited

U.S. PATENT DOCUMENTS 9,485,725 B2   11/2016  Yaacoub
2009/0170472 A1*  7/2009  Chapin ............... H04W 12/086
                                                   455/410

(Continued)

FOREIGN PATENT DOCUMENTS

CN    102742332 A    10/2012
CN    104170355 A    11/2014

(Continued)

OTHER PUBLICATIONS

Han, Fengxia, et al. "Survey of strategies for switching off base stations in heterogeneous networks for greener 5G systems." IEEE Access 4 (2016): 4959-4973. (Year: 2016).*

(Continued)

*Primary Examiner* — Nathan S Taylor
(74) *Attorney, Agent, or Firm* — Leydig, Voit & Mayer, Ltd.

(57) ABSTRACT

The invention relates to a network entity for controlling a respective operation mode of a plurality of physical base stations of a wireless communication network 100. The network entity comprises processing circuitry configured to: obtain a respective current data load of each of a plurality of physical base stations in an active operation mode; estimate a respective current data load of each of a plurality of virtual base stations based on the respective current data loads of the plurality of physical base stations; predict a respective data load of each of the plurality of virtual base stations; and adjust, based on the respective data loads of the plurality of virtual base stations, the operation mode of one or more of the plurality of physical base stations to the idle operation mode.

20 Claims, 7 Drawing Sheets

(56) References Cited

U.S. PATENT DOCUMENTS

| | | | | |
|---|---|---|---|---|
| 2013/0281049 | A1* | 10/2013 | Lee | H04W 24/02 455/405 |
| 2013/0310048 | A1* | 11/2013 | Hunukumbure | H04W 52/0206 455/443 |
| 2014/0211698 | A1* | 7/2014 | Aguirre | H04L 47/805 370/329 |
| 2014/0241315 | A1* | 8/2014 | Niu | H04W 36/0011 370/331 |
| 2014/0317260 | A1* | 10/2014 | Lee | G06F 8/60 709/223 |
| 2015/0055483 | A1* | 2/2015 | Lee | H04L 41/0803 370/242 |
| 2015/0296392 | A1* | 10/2015 | Chen | H04W 24/02 370/328 |
| 2017/0064031 | A1* | 3/2017 | Sunay | H04W 72/082 |
| 2017/0079059 | A1* | 3/2017 | Li | H04W 16/02 |
| 2017/0271877 | A1* | 9/2017 | Stewart | H02J 13/00034 |
| 2018/0359805 | A1* | 12/2018 | Tsuda | H04W 24/10 |
| 2019/0059109 | A1* | 2/2019 | Li | H04W 74/0833 |
| 2019/0324070 | A1* | 10/2019 | Saneyoshi | H02J 13/0017 |
| 2019/0364492 | A1* | 11/2019 | Azizi | H04W 48/16 |
| 2020/0036414 | A1* | 1/2020 | Shattil | H04B 7/024 |
| 2020/0396620 | A1* | 12/2020 | Wei | H04W 72/0406 |

FOREIGN PATENT DOCUMENTS

| | | |
|---|---|---|
| CN | 105025541 A | 11/2015 |
| WO | 2015165095 A1 | 11/2015 |

OTHER PUBLICATIONS

González-Brevis et al., "Base Station Location Optimization for Minimal Energy Consumption in Wireless Networks," 2011 IEEE 73rd Vehicular Technology Conference (VTC Spring), Yokohama, Japan, Total 5 pages, Institute of Electrical and Electronics Engineers, New York, New York (May 15-18, 2011).

Han et al., "Green Radio: Radio Techniques to Enable Energy-Efficient Wireless Networks," IEEE Communications Magazine, vol. 49, No. 6, pp. 46-54, Institute of Electrical and Electronics Engineers, New York, New York (May 2011).

Csárdi et al., "The igraph software package for complex network research," InterJournal Complex Systems, pp. 1-9, (Nov. 2005).

Hartigan et al., "Algorithm AS 136: A K-Means Clustering Algorithm," Journal of the Royal Statistical Society, Series C (Applied Statistics), vol. 28, No. 1, pp. 100-108 (1979).

Liu et al., "Small Cell Base Station Sleep Strategies for Energy Efficiency," IEEE Transactions on Vehicular Technology, vol. 65, No. 3, pp. 1-10, Institute of Electrical and Electronics Engineers, New York, New York (Mar. 2015).

Chiaraviglio et al., "Energy-Efficient Planning and Management of Cellular Networks," 2012 9th Annual Conference on Wireless On-Demand Network Systems and Services (WONS), Courmayeur, Italy, pp. 159-166, Institute of Electrical and Electronics Engineers, New York, New York (Jan. 9-11, 2012).

Pollakis et al., "Traffic Demand-Aware Topology Control for Enhanced Energy-Efficiency of Cellular Networks," EURASIP Journal on Wirless Communications and Networking, pp. 1-30, Institute of Electrical and Electronics Engineers, New York, New York (Mar. 2015).

Niu et al., "Cell Zooming for Cost-Efficient Green Cellular Networks," IEEE Communications Magazine, vol. 48, No. 11, pp. 74-79, Institute of Electrical and Electronics Engineers, New York, New York (Nov. 2010).

González-Brevis et al., "Base Station Location Optimization for Minimal Energy Consumption in Wireless Networks," 2011 IEEE 73rd Vehicular Technology Conference (VTC Spring), Budapest, Hungary, Total 5 pages, Institute of Electrical and Electronics Engineers, New York, New York (May 15-18, 2011).

Corcoran et al., "Emerging Trends in Electricity Consumption for Consumer ICT," Total 57 pages (Jul. 2013).

Han et al., "Green Radio: Radio Techniques to Enable Energy-Efficient Wireless Networks," IEEE Communications Magazine, vol. 49, No. 6, pp. 46-54, Institute of Electrical and Electronics Engineers, New York, New York (Jun. 2011).

Boyd et al., "Convex Optimization," Cambridge University Press, Total 730 pages, New York, NY, USA (2004).

Nocedal "Updating Quasi-Newton Matrices With Limited Storage," Mathematics of Computation, vol. 35, No. 151, pp. 773-782 (Jul. 1980).

Goldberg et al., "A New Approach to the Maximum Flow Problem," STOC '86: Proceedings of the Eighteenth Annual ACM symposium on Theory of computing, pp. 136-146, New York, NY, USA (Nov. 1986).

Csárdi et al., "The igraph software package for complex network research," InterJournal Complex Systems, pp. 1-9, Nov. 2006.

"IEEE Standard for Information technology—Telecommunications and information exchange between systems—Local and metropolitan area networks—Specific requirements—Part 11: Wireless LAN Medium Access Control (MAC) and Physical Layer (PHY) Specifications—Amendment 5: Enhancements for Higher Throughput," in IEEE STD 802.11n-2009, pp. 1-536, Institute of Electrical and Electronics Engineers, New York, New York (Oct. 2009).

* cited by examiner

| ON/OFF configuration | Optimization approach | | | Flow network approach | | |
|---|---|---|---|---|---|---|
| Smoothness in grid traffic estimation | Spatial | Temporal | Both | Spatial | Temporal | Both |
| Average time(s) | 5.69 | 6.74 | 3.73 | 11.02 | 10.65 | 10.44 |
| Average number of OFF BS | 175.55 ± 0.31 | 175.66 ± 0.51 | 176.02 ± 0.55 | 316.97 ± 0.03 | 316.95 ± 0.03 | 316.97 ± 0.03 |
| Average broken capacities | 0.11 ± 0.01 | 0.11 ± 0.01 | 0.11 ± 0.01 | 4.93 ± 0.83 | 5.04 ± 0.85 | 4.96 ± 0.84 |
| Coverage | 100% | 100% | 100% | 100% | 100% | 100% |

Fig. 6

DEVICES AND METHODS FOR CONTROLLING BASE STATIONS OF A COMMUNICATION NETWORK

CROSS-REFERENCE TO RELATED APPLICATIONS

This application is a continuation of International Application No. PCT/EP2018/052396, filed on Jan. 31, 2018. The disclosure of the aforementioned application is hereby incorporated by reference in its entirety.

TECHNICAL FIELD

Generally, the present disclosure relates to the field of wireless communication networks. More specifically, the present disclosure relates to devices and methods for controlling a respective operation mode of a plurality of physical base stations of a wireless communication network in an energy efficient manner.

BACKGROUND

Energy efficiency is one of today's most significant requirements in wireless communications. In 2012, the ICT worldwide consumption has been estimated to be approximately 1950 TWhr/yr, with the communication networks themselves consuming 350 TWhr/yr of this total. It has been estimated that in the year 2017 the worldwide network electricity consumption is about 730 TWhr/yr. With the advent of cloud computing, the network fraction has been constantly growing from 20% in 2012 to 29% in 2017 and base stations account for about 50% of the network consumption.

Thus, operating these ever-expanding wireless communication networks is very demanding in respect of maintenance and energy consumption. Hence energy efficiency is one of the most significant requirements of emerging and future wireless communication networks, especially with the incoming 5G technology that relies on very dense networks. Many efforts are put at the hardware level by trying to reduce substantially the energy footprint of every CPU cycle or transmission of every piece of hardware. Other known approaches address the task of reducing the energy consumption of a wireless network by operating base stations in different power modes, also known as Power Mode of Operation (PMO), depending on the demand of the network.

There have been several studies concerned with the task of PMO adjustment of the base stations of a wireless network. A well-known and commonly used approach for BSs' PMO management was proposed as part of the IEEE 802.11b standard. A major drawback of the approach adopted in this standard is that no QoS and/or avoidance of coverage holes can be guaranteed.

Finding the best locations to deploy the base stations of a wireless network has been addressed in P. Gonzalez-Brevis et al., "Base Station Location Optimization for Minimal Energy Consumption in Wireless Networks," in 2011 IEEE 73rd Vehicular Technology Conference (VTC Spring), 2011, pp. 1-5 as an optimization problem so as to minimize energy consumption. However, traffic statistics are not taken into consideration.

Cell zooming has been introduced in Z. Niu, Y. Wu, J. Gong, and Z. Yang, "Cell zooming for cost-efficient green cellular networks," IEEE Communications Magazine, vol. 48, no. 11, pp. 74-79, November 2010, which adaptively adjusts the cell size according to traffic load, user requirements and channel conditions.

Adapting the energy saving strategy to the spatial and temporal fluctuations while respecting QoS has been described in L. Chiaraviglio, D. Ciullo, G. Koutitas, M. Meo, and L. Tassiulas, "Energy-efficient planning and management of cellular networks," in 2012 9th Annual Conference on Wireless On-Demand Network Systems and Services (WONS), 2012, pp. 159-166 and in E. Pollakis, R. L. G. Cavalcante, and S. Stanczak, "Traffic demand-aware topology control for enhanced energy-efficiency of cellular networks," EURASIP Journal on Wireless Communications and Networking, vol. 2016, no. 1, p. 61, February 2016. In the article by L. Chiaraviglio et al local greedy strategies are used in order to plan a sleep plan for the base stations of a wireless network according to their load or their overlapping area of effect. In the article by E. Pollakis et al a best subset of base stations is selected in order to maximize the energy saving by solving a relaxed NP-hard combinatorial problem.

US2013/310048A1 describes a method which optimizes the energy efficiency of heterogeneous cellular networks.

In the light of the above, there is still a need for improved devices and methods for controlling a plurality of physical base stations of a wireless communication network in an energy efficient manner.

SUMMARY

The present disclosure describes improved devices and methods for controlling a plurality of physical base stations of a wireless communication network in an energy efficient manner.

Generally, embodiments described herein are based on an adaptive selection scheme which proceeds in four steps: (i) gathering load data from the physical base stations of a wireless communication network; (ii) disaggregation of the data to a plurality of virtual base stations to dispose of more granular information about local demand and supply; (iii) incorporation of the disaggregated data into the global mapping of all base stations; (iv) solving an optimization problem under QoS and capacity constraints to find a subset of the physical base stations of the wireless communication network that may be turned off for energy saving purposes.

More specifically, according to a first aspect, the disclosure relates to a network entity for controlling a respective operation mode of a plurality of physical base stations of a wireless communication network, wherein the plurality of physical base stations define a spatial coverage region of the wireless communication network and each of the plurality of physical base stations is configured to be operated in an active operation mode (i.e. a normal mode) or an idle operation mode (i.e. a deactivated low energy consumption mode). The network entity comprises a processing unit configured to: (a) obtain a respective current data load, i.e. downlink and uplink data volume per time interval, of each of the plurality of physical base stations in the active operation mode; (b) estimate a respective current data load of a plurality of virtual base stations on the basis of the respective current data loads of the plurality of physical base stations, wherein the plurality of virtual base stations are distributed over the spatial coverage region and wherein the number of virtual base stations is larger than the number of physical base stations; (c) predict on the basis of the respective estimated current data loads of the plurality of virtual base stations a respective data load of each of the plurality of virtual base stations; and (d) adjust on the basis of the respective data loads of the virtual base stations the operation mode of one or more of the plurality of physical base stations to the idle operation mode.

Thus, by providing a global management of base stations at a higher level, the network entity according to the first aspect allows the base stations of a wireless communication network to be operated in an energy efficient manner, for instance, by switching off base stations that are unlikely to be used in a given time horizon.

In a further possible implementation form of the first aspect, the network entity further comprises a communication interface configured to send a respective operation mode adjustment signal to the one or more of the plurality of physical base stations for adjusting the operation mode of the one or more of the plurality of physical base stations to the idle operation mode.

In a further possible implementation form of the first aspect, the processing unit is configured to obtain the respective current data load of each of the plurality of physical base stations by receiving information about the current data load of each of the plurality of physical base stations from each of the plurality of physical base stations.

In a further possible implementation form of the first aspect, the processing unit is configured to estimate the respective current data load of the plurality of virtual base stations on the basis of the spatial locations of the plurality of physical base stations and the spatial locations of the plurality of virtual base stations.

In a further possible implementation form of the first aspect, the processing unit is configured to estimate the respective current data load of the plurality of virtual base stations on the basis of the following equation:

$$x_t = P \cdot l_t,$$

wherein $x_t$ denotes a vector defined by the current data loads of the plurality of physical base stations and $l_t$ denotes a vector defined by the current data loads of the plurality of virtual base stations and wherein P denotes a projection matrix depending on the spatial locations of the plurality of physical base stations and the spatial locations of the plurality of virtual base stations.

In a further possible implementation form of the first aspect, the processing unit is configured to predict the respective data load of each of the plurality of virtual base stations by determining a solution of a minimization problem defined by the following equations:

$$\min_{\forall i, l_{t,i} \geq 0} \ \|P l_t - x_t\|^2 + \alpha \sum_{i,j \ neighbors} (l_{t,i} - l_{t,j})^2 + \lambda \|l_t - l_{t-1}\|^2$$

$$\text{s.t.} \ \sum_i l_{t,i} - \sum_k x_{t,k} = 0,$$

wherein $x_{t,k}$ is the k-th component of the vector $x_t$ and denotes the current data load of the k-th physical base station, $l_{t,i}$ is the i-th component of the vector $l_t$ and denotes the current data load of the i-th virtual base station, α denotes a spatial smoothness parameter and λ denotes a temporal smoothness parameter.

In a further possible implementation form of the first aspect, the spatial smoothness parameter α is equal to or larger than 0 and smaller than 20, in particular 10, and/or wherein the temporal smoothness parameter λ is equal to or larger than 0 and smaller than 20, in particular 10.

In a further possible implementation form of the first aspect, the processing unit is configured to determine the one or more of the plurality of physical base stations, whose operation mode is to be adjusted to the idle operation mode, by determining a solution of a Lasso-like optimization problem defined by the following equations:

$$\min_{\beta \geq 0} \ \kappa \|\beta\|_1 + (\Sigma_i \beta_i \diamond (P \ l_t)_i - \Sigma_j l_j)^2$$

$$\text{s.t.} \ \forall j, \ (^t P \beta)_j > 0$$

$$\forall i, \ \beta_i \cdot (^t P l_t)_i \leq C_i,$$

wherein κ denotes a hyper-parameter of the Lasso-like optimization problem, β denotes a vector associated with the operation mode of each of the plurality of physical base stations and the operator ∘ denotes the pointwise product of vectors.

In a further possible implementation form of the first aspect, the processing unit is configured to determine the one or more of the plurality of physical base stations, whose operation mode is to be adjusted to the idle operation mode, on the basis of a flow network model comprising a source and a sink, wherein the plurality of virtual base stations are nodes of a first layer of a fully connected graph between the source and the sink and the plurality of physical base stations are nodes of a second layer of the fully connected graph between the source and the sink.

In a further possible implementation form of the first aspect, the processing unit is configured to determine the one or more of the plurality of physical base stations, whose operation mode is to be adjusted to the idle operation mode, on the basis of a flow network model comprising a source and a sink and on the basis of a greedy algorithm.

In a further possible implementation form of the first aspect, the processing unit is further configured to estimate an error value associated with the respective loads of the virtual base stations and to adjust the operation mode of one or more of the plurality of physical base stations to the idle operation mode, if the error value is smaller than a threshold value.

In a further possible implementation form of the first aspect, the processing unit is further configured to repeat (a) to (d) for a plurality of time steps.

According to a second aspect, the disclosure relates to a corresponding method for controlling a respective operation mode of a plurality of physical base stations of a wireless communication network, wherein the plurality of physical base stations define a spatial coverage region of the wireless communication network and each of the plurality of physical base stations is configured to be operated in an active operation mode or an idle operation mode. The method comprises the steps of: (a) obtaining a respective current data load of each of the plurality of physical base stations in the active operation mode; (b) estimating a respective current data load of a plurality of virtual base stations on the basis of the respective current data loads of the plurality of physical base stations, wherein the plurality of virtual base stations are distributed over the spatial coverage region and wherein the number of virtual base stations is larger than the number of physical base stations; (c) predicting on the basis of the respective estimated current data loads of the plurality of virtual base stations a respective data load of each of the plurality of virtual base stations; and (d) adjusting on the basis of the respective loads of the virtual base stations the operation mode of one or more of the plurality of physical base stations to the idle operation mode.

The method according to the second aspect of the disclosure can be performed by the network entity according to the first aspect of the disclosure. Further features of the method according to the second aspect of the disclosure result directly from the functionality of the network entity according to the first aspect of the disclosure and its different implementation forms.

According to a third aspect the disclosure relates to a computer program comprising program code for performing the method according to the second aspect when executed on a computer or a processor.

The invention can be implemented in hardware and/or software.

BRIEF DESCRIPTION OF THE DRAWINGS

Further embodiments will be described with respect to the following figures, wherein:

FIG. 6 shows a schematic diagram illustrating different aspects of the network entity according to an embodiment.

In the various figures, identical reference signs will be used for identical or at least functionally equivalent features.

DETAILED DESCRIPTION OF EMBODIMENTS

In the following description, reference is made to the accompanying drawings, which form part of the disclosure, and in which are shown, by way of illustration, specific aspects in which the present invention may be placed. It is understood that other aspects may be utilized and structural or logical changes may be made without departing from the scope of the invention. The following detailed description, therefore, is not to be taken in a limiting sense, as the scope of the invention is defined by the appended claims.

For instance, it is understood that a disclosure in connection with a described method may also hold true for a corresponding device or system configured to perform the method and vice versa. For example, if a specific method step is described, a corresponding device may include a unit to perform the described method step, even if such unit is not explicitly described or illustrated in the figures. Further, it is understood that the features of the various exemplary aspects described herein may be combined with each other, unless specifically noted otherwise.

Figure 1:
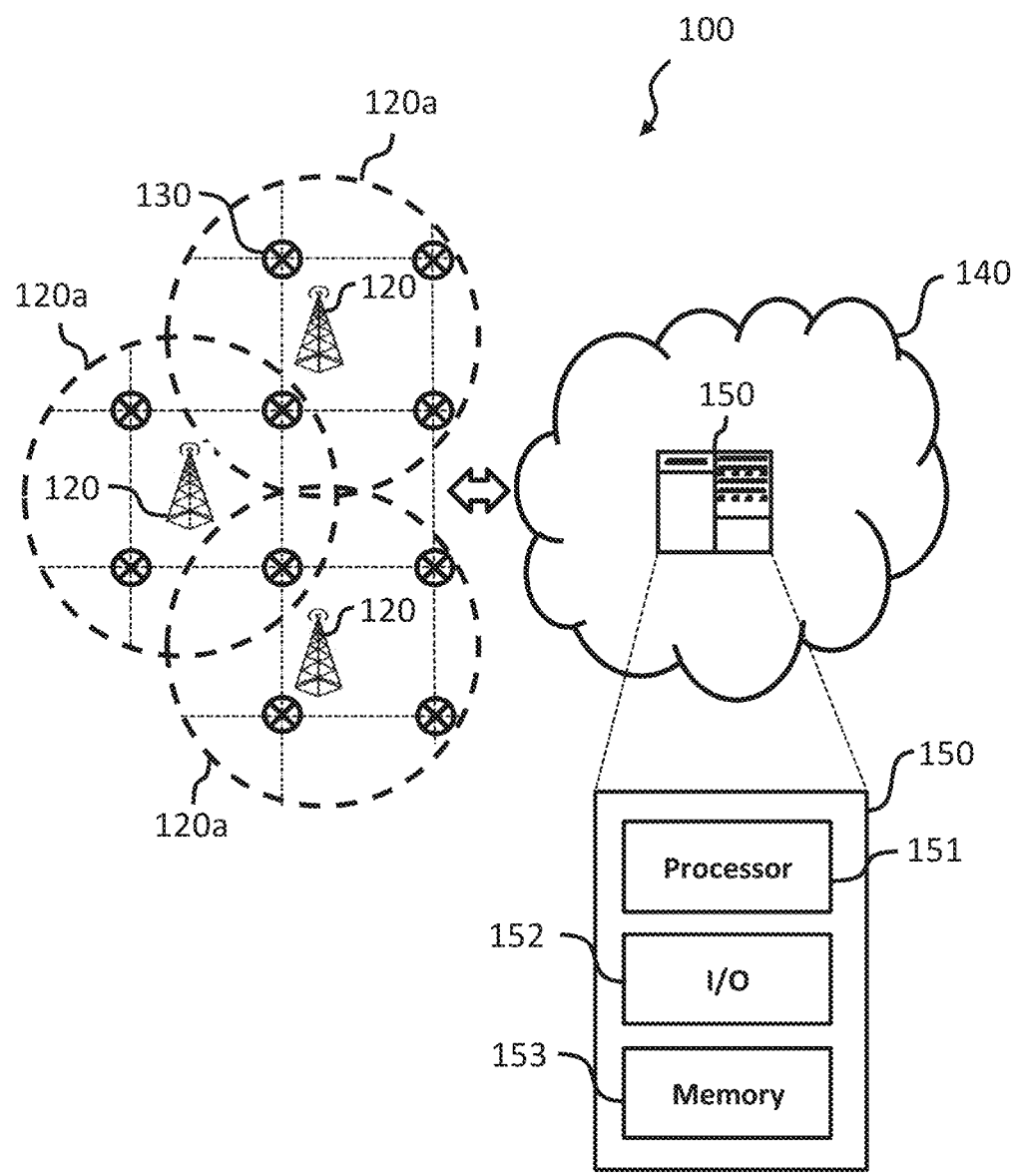
FIG. 1 shows a schematic diagram illustrating a wireless communication network comprising a plurality of physical base stations and a network entity for controlling the operation mode thereof according to an embodiment.

FIG. 1 shows a schematic diagram illustrating a wireless communication network 100 comprising a plurality of physical base stations 120 and a network entity 150 for controlling the operation mode of the plurality of physical base stations 120 according to an embodiment. In an embodiment, the wireless communication network 100 can be a cellular or mobile wireless communication network 100. In an embodiment, the plurality of physical base stations 120 can be part of a radio access network (RAN) of the wireless communication network 100. In an embodiment, the network entity 150 is located in a core network 140 of the wireless communication network 140. In an embodiment, the plurality of physical base stations 120 are configured to provide user equipment access to the services, such as communication services, provided by the core network 140 of the wireless communication network 100.

The network entity 150, which can be implemented on one or more servers or as a network function in the core network 140 of the wireless communication network 100, is configured to control a respective operation mode of the plurality of physical base stations 120, wherein each of the plurality of physical base stations is configured to be operated in an active operation mode (i.e. a normal or "on" mode) or an idle operation mode (i.e. a deactivated low energy consumption or "off" mode). The plurality of physical base stations 120 define a spatial coverage region 120a of the wireless communication network 100. In an embodiment, this spatial coverage region 120a of the wireless communication network 100 can be the area covered by the communication cells defined by the respective physical base stations 120.

As can be taken from the detailed view shown in FIG. 1, the network entity 150 comprises a processing unit 151. In an embodiment, the network entity 150 can further comprise a communication interface 152 and/or a memory 153.

As will be described in more detail further below, the processing unit 151 of the network entity 150 is configured to: (a) obtain a respective current data load of each of the plurality of physical base stations 120 in the active operation mode; (b) estimate a respective current data load of a plurality of virtual base stations 130 on the basis of the respective current data loads of the plurality of physical base stations 120, wherein the plurality of virtual base stations 130 are distributed over the spatial coverage region 120a and wherein the number of virtual base stations 130 is larger than the number of physical base stations 120; (c) predict on the basis of the respective estimated current data loads of the plurality of virtual base stations 130 a respective data load of each of the plurality of virtual base stations 130; and (d) adjust on the basis of the respective data loads of the virtual base stations 130 the operation mode of one or more of the plurality of physical base stations 120 to the idle operation mode.

In an embodiment, the data load of a physical or virtual base station can be the downlink and uplink data volume per time interval of the respective base station. As illustrated in FIG. 1, the plurality of virtual base stations 130 (for the sake of clarity only one of the plurality of virtual base stations has been identified by the reference sign 130) can be located on a grid covering the spatial coverage region 120a. In an embodiment, the communication interface 152 of the network entity 150 is configured to send a respective operation mode adjustment signal to the one or more of the plurality of physical base stations 120 for adjusting the operation mode of the one or more of the plurality of physical base stations 120 to the idle operation mode.

Figure 2:
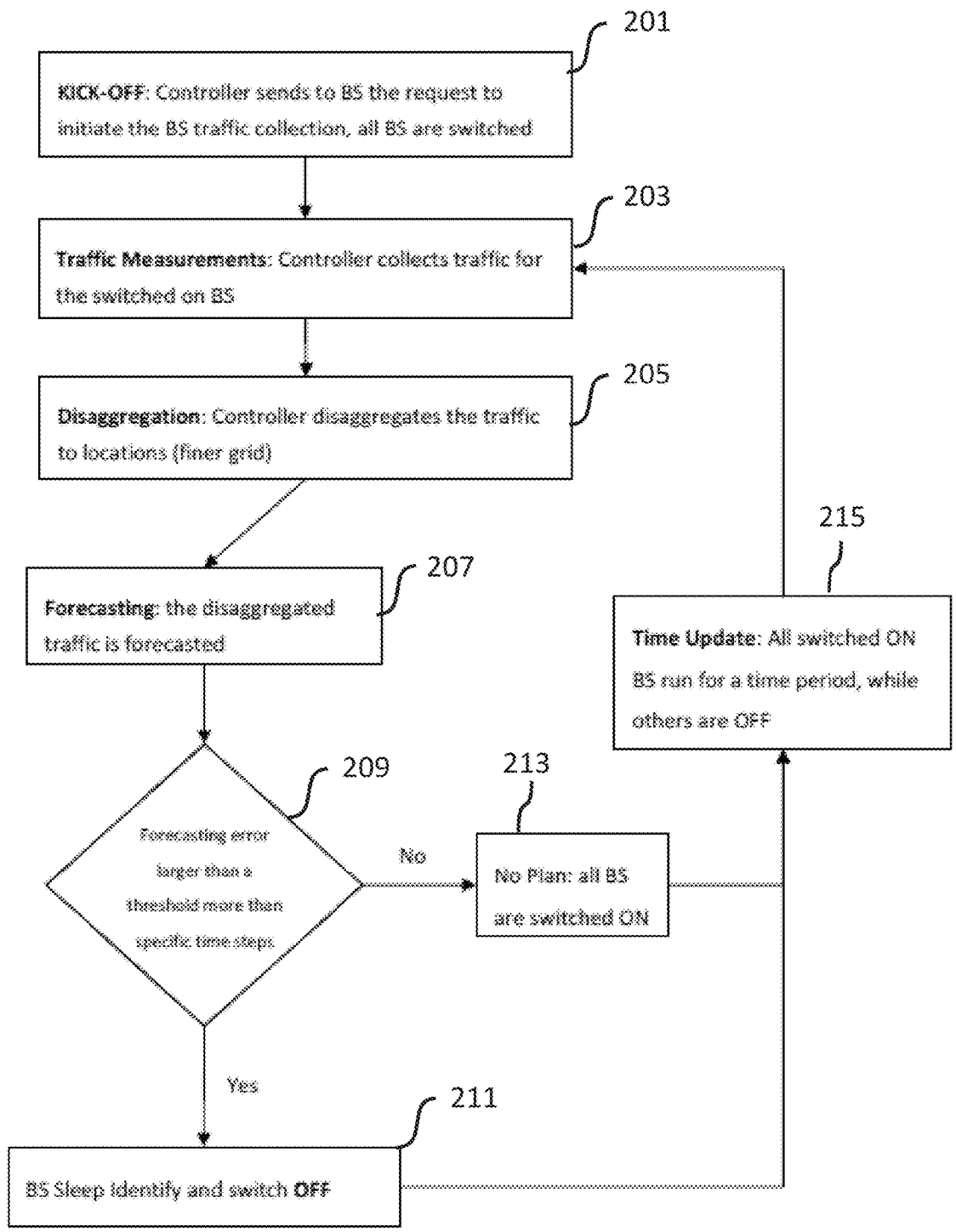
FIG. 2 shows a schematic diagram illustrating different aspects of the network entity according to an embodiment.

FIG. 2 shows a flow diagram illustrating several processing steps implemented in the network entity 150 according to an embodiment, which in the embodiment of FIG. 2 is implemented in the form of a controller 150.

In a first stage 201, the network entity, i.e. controller 150 sends to the physical base stations 120 a respective request to initiate the data load estimation at the respective physical base stations 120. All physical base stations 120 being considered are in the active operation mode.

In a second stage 203, the network entity, i.e. controller 150 collects the current data load of the physical base stations 120 being in the active operation mode. Thus, in an embodiment, the processing unit 151 is configured to obtain the respective current data load of each of the plurality of physical base stations 120 by receiving information about the current data load of each of the plurality of physical base stations 120 from each of the plurality of physical base stations 120.

In a third stage 205, the processing unit 151 of the network entity, i.e. controller 150 disaggregates the respective current data loads of the plurality of physical base stations 120 to the plurality of virtual base stations 130 by estimating a respective current data load of a plurality of virtual base stations 130 on the basis of the respective current data loads of the plurality of physical base stations 120, as already described above. In an embodiment, the processing unit 151 of the network entity 150 is configured to estimate the respective current data load of the plurality of virtual base stations 130 on the basis of the spatial locations of the plurality of physical base stations 120 and the spatial locations of the plurality of virtual base stations 130. The disaggregation to the plurality of virtual base stations 130 is an important step for providing traffic, i.e. data load information at a finer granularity than the measurements made at the plurality of physical base stations 120. This allows a deeper understanding of the local traffic and hence permits a better switching plan, i.e. adjustment of the respective operation modes of the plurality of physical base stations 120. An advantage of the disaggregation process is that the disaggregated signal does not depend on which physical base stations 120 are ON or OFF.

As already described above, the traffic, i.e. data load is measured at each of the n physical base stations 120 and defines a vector $x_t$, i.e. the vector of data loads of all physical base stations 120 at time t. As already described above, a grid on the spatial coverage area 120a can be constructed and each virtual base station 130 can be placed at every grid point. As will be appreciated, this grid only depends on the topology of the spatial coverage area 120a, but neither on the location or the current operation mode (ON/OFF) of the plurality of physical base stations 120. The current data load of all the virtual base stations 130 can be described as a vector $l_t$. In an embodiment, the processing unit 151 of the network entity 150 use a projection matrix P to aggregate the signal from the plurality of virtual base stations 130 to the plurality of physical base stations 120. The projection matrix P provides a description of how every virtual base station 130 is related to the physical base stations 120 in its vicinity. In an embodiment, the elements $\tilde{P}_{i,j}$ can be based on the respective distances between the spatial locations VBS(i) of the plurality of virtual base stations 130 and the spatial locations BS(j) of the plurality of physical base stations, i.e. $\tilde{P}_{i,j} = \|VBS(i) - BS(j)\|_2^{-2}$. These elements can be normalized to have a projection matrix P such that $\Sigma_j P_{i,j} = 1$. As the projection matrix P only depends on the topology, i.e. the spatial locations of the virtual base stations 130 and the physical base stations it only has to be computed once, for instance, during the stage 201 and can be stored, for instance, in the memory 153 of the network entity 150 for further use at later time steps.

Thus, in an embodiment, the processing unit 151 of the network entity 150 is configured to estimate the respective current data load of the plurality of virtual base stations 130 on the basis of the following equation:

$$x_t = P \cdot l_t,$$

wherein $x_t$ denotes a vector defined by the current data loads of the plurality of physical base stations 120 and $l_t$ denotes a vector defined by the current data loads of the plurality of virtual base stations 130 and wherein P denotes a projection matrix depending on the spatial locations of the plurality of physical base stations 120 and the spatial locations of the plurality of virtual base stations 130.

In a fourth stage 207, the processing unit 151 of the network entity, i.e. controller 150 forecasts the disaggregated data loads, i.e. predicts on the basis of the respective estimated current data loads of the plurality of virtual base stations 130 a respective data load of each of the plurality of virtual base stations 130, as already described above.

Given a model for the projection matrix P, the objective is to estimate $l_t$ given the measured data $x_t$ and $P(l_t)$. More precisely, the system $x_t = P(l_t)$ has to be solved by the processing unit 151 of the network entity 150. As there are more virtual base stations 130 than physical base stations 120, this is an under-determined system.

In an embodiment, the processing unit 151 of the network entity 150 is configured to predict the respective data load of each of the plurality of virtual base stations 130 by determining a solution of a minimization problem defined by the following equations:

$$\min_{\forall i, l_{t,i} \geq 0} \|P l_t - x_t\|^2 + \alpha \sum_{i,j \text{ neighbors}} (l_{t,i} - l_{t,j})^2 + \lambda \|l_t - l_{t-1}\|^2$$

$$\text{s.t.} \sum_i l_{t,i} - \sum_k x_{t,k} = 0,$$

wherein $x_{t,k}$ is the k-th component of the vector $x_t$ and denotes the current data load of the k-th physical base station 120, $l_{t,i}$ is the i-th component of the vector $l_t$ and denotes the current data load of the i-th virtual base station 130, α denotes a spatial smoothness parameter and λ denotes a temporal smoothness parameter. In another embodiment, the processing unit 151 of the network entity is configured to predict the respective data load of each of the plurality of virtual base stations 130 by determining a solution of the dual version of the above minimization problem.

In an embodiment, the processing unit 151 of the network entity 150 is configured to solve the dual problem of the minimization problem described above using the L-BFGS-B quasi-Newton algorithm disclosed in J. Nocedal, "Updating quasi-Newton matrices with limited storage," Math. Comp., vol. 35, no. 151, pp. 773-782, 1980. This is because the problem is quadratic and may be rewritten in the following form:

$$\min_{l \geq 0} f(l) = \frac{1}{2} l^t \cdot Q \cdot l + p^t \cdot l$$

with the constraint $A \cdot l = b$, where Q can be deduced from p and $l_{t-1}$ and the topology of the network 100 (spatial smoothness term). This problem is equivalent to its dual form $$\max_{\lambda \geq 0, v} -\frac{1}{2} (\lambda - p - Av)^t \cdot Q^{-1} \cdot (\lambda - p - Av) - b^t v$$

wherein λ and v denote Lagrangian multipliers.

In an embodiment, the spatial smoothness parameter α is equal to or larger than 0 and smaller than 20, in particular 10, and/or the temporal smoothness parameter λ is equal to or larger than 0 and smaller than 20, in particular 10.

By means of the optimization problem above, the processing unit 151 of the network entity 150 tries to estimate the (positive) load $l_t$ of all virtual base stations 130. It first aims to reduce the noise from the interpolation of $l_t$. The parameter α provokes spatial smoothness over the base stations: neighboring locations on the grid have "similar" traffic loads. The λ term enforces temporal smoothness between time steps, the load at time t−1 is used to estimate the load at time t. Finally the constraint ensures that the full load is globally preserved from the measurements of the physical base stations 120 to the estimation of the current loads of the virtual base stations 130.

In a fifth stage 209, the processing unit 151 of the network entity, i.e. controller 150 is further configured to estimate an error value associated with the respective loads of the virtual base stations 130 and to adjust the operation mode of one or more of the plurality of physical base stations 120 to the idle operation mode, if the error value is smaller than a threshold value (stage 211). Otherwise, all physical base stations 120 remain in the active operation mode (stage 213). Thereafter, the process can be repeated for the next time step starting at stage 203 (stage 215).

In the following different embodiments will be described for determining the one or more of the plurality of physical base stations 120, whose operation mode is to be adjusted to the idle operation mode, namely embodiments based on the solution of an optimization problem and embodiments based on a network flow model.

In an embodiment, the processing unit 151 of the network entity 150 is configured to determine the one or more of the plurality of physical base stations 120, whose operation mode is to be adjusted to the idle operation mode, by determining a solution of a Lasso-like optimization problem defined by the following equations:

$$\min_{\beta \geq 0} \kappa \|\beta\|_1 + (\Sigma_i \beta_i \diamond (P\,l_t)_i - \Sigma_j \hat{l}_j)^2$$
$$\text{s.t. } \forall j, (^t P \beta)_j > 0$$
$$\forall i, \beta_i \cdot (^t P l_t)_i \leq C_i,$$

wherein κ denotes a hyper-parameter of the Lasso-like optimization problem, β denotes a vector associated with the operation mode of each of the plurality of physical base stations 120 and the operator ° denotes the pointwise product of vectors. In another embodiment, the processing unit 151 of the network entity 150 is configured to determine the one or more of the plurality of physical base stations 120, whose operation mode is to be adjusted to the idle operation mode, by determining a solution of the dual version of the above Lasso-like optimization problem.

The $\beta_i$ coefficient models the estimated load of the i-th physical base station 120 relative to the hypothesis where they are all switched on. Hence a 0 implies that the i-th physical base station 120 is switched off; a 1.4 that the volume traffic going through the ith BS will be 1.4 times more important than in the fully switched on mode. This coefficient may vary between 0 and ∞. In practice, the coefficient should not exceed the capacity of the physical base station, which corresponds to the constraint $C_i$. The Lasso flavored coefficient K insures that many coefficients of β will be chosen to be 0. The quadratic term $(\Sigma_i \beta_i \cdot (P\hat{l}_t)_i - \Sigma_j \hat{l}_j)^2$ is the dual of the constraint of the preservation of the demand.

Figure 3:
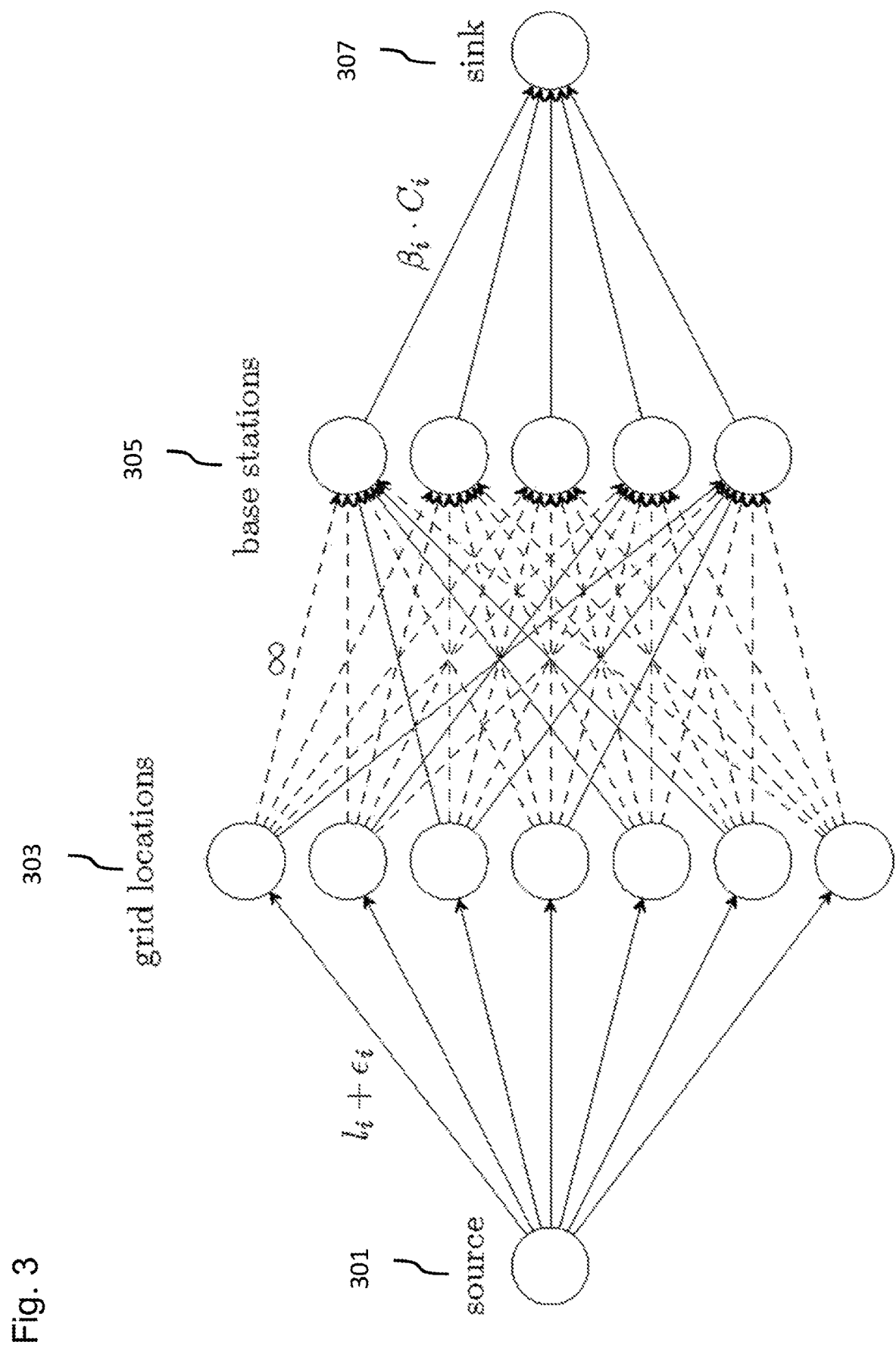
FIG. 3 shows a schematic diagram illustrating different aspects of the network entity according to an embodiment.

In an embodiment, the processing unit 151 of the network entity 150 is configured to determine the one or more of the plurality of physical base stations 120, whose operation mode is to be adjusted to the idle operation mode, on the basis of a flow network model using a fully connected graph 300, as shown in FIG. 3. The fully connected graph 300 comprises a source 301 and a sink 307, wherein the plurality of virtual base stations 130 are nodes of a first layer 303 of the fully connected graph 300 between the source 301 and the sink 307 and the plurality of physical base stations 120 are nodes of a second layer 305 of the fully connected graph 300 between the source 301 and the sink 307. In an embodiment, the processing unit 151 of the network entity 150 is configured to determine the one or more of the plurality of physical base stations 120, whose operation mode is to be adjusted to the idle operation mode, on the basis of the fully connected graph 300, i.e. the flow network model, and a greedy algorithm.

Figure 4:
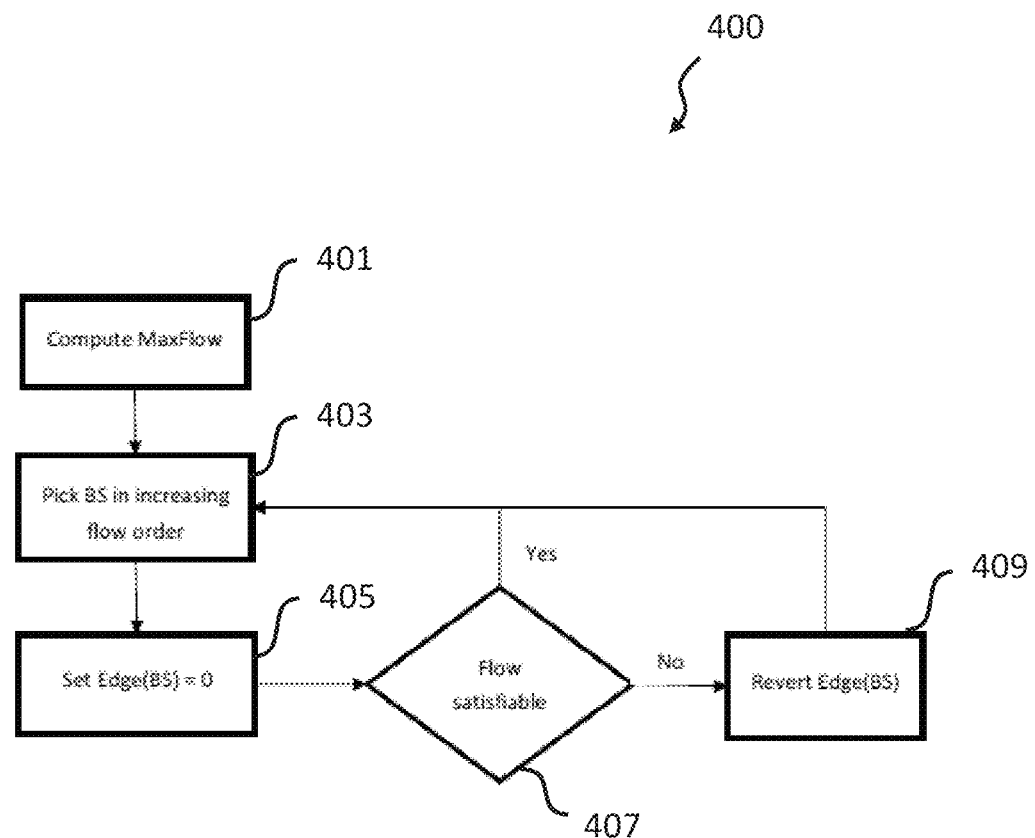
FIG. 4 shows a schematic diagram illustrating different aspects of the network entity according to an embodiment.

The transmission from the virtual base stations(s) 130 to the physical base stations 120 is modeled as a flow on this graph 300. To ensure coverage, every edge from the source 301 to the ith virtual base station 130 located in the first layer 303 is weighted to be the virtual load $l_i + \epsilon_i$, where $\epsilon_i$ is to be defined as a security (for example if $l_i$ is 0 (no usage of the VBS)), we still want to provide service for anyone entering this zone. The weight of an edge between a virtual base station 130 located in the first layer 303 and a physical base station located in the second layer 305 is set to be ∞ or 0 whether they are related or not. As a way to ensure that the capacity constraints are verified, the weight of every edge from the ith physical base station 120 located in the second layer 305 to the sink 307 is set to be its capacity $C_i$. In conclusion, the existence of a maximum flow of weight $\Sigma_i(\hat{l}_i + \epsilon_i)$ induces a full transfer of traffic load between the virtual base station(s) 130 and the physical base station(s) 120. In particular, if a maximum flow with the same weight can be found, which does not pass through a physical base station 120, this physical base station 120 can be switched off. The above described process is illustrated by steps 401, 403, 405, 407 and 409 of FIG. 4.

By way of example, embodiments have been used to control 507 physical base stations 120 located in a rectangular part of a dense area of the city of Xi'an in China. The traffic, i.e. data loads in this area have been disaggregated on a square grid of 60 m unit. At first, the maximum capacity of each physical base station 120 has been arbitrarily chosen to be equal to 3 times the maximum of its traffic volume seen during the whole data collecting process. For P we normalize the matrix of the inverse of Euclidean distances between base stations that are closer than 350 m. Really close base stations (less than 10 m) are considered to have a distance of 10 m. The physical base stations 120 have been numerated from 1 to m and the virtual base stations 130 from 1 to n, and the following projection matrix has been used:

$$\tilde{P}_{i,j} = \|VBS(i) - BS(j)\|_2^{-2}.$$

After setting to 0 every cell above a certain threshold (350 m), the rows of $\tilde{P}$ have been normalized to obtain a normalized projection matrix P such that for all i, $\Sigma_j P_{i,j} = 1$. It corresponds to a perfect aggregation of the signal, such that the whole signal from a virtual base station 130 may be associated with the physical base stations 120 in its vicinity.

Note that this computation is only done once at startup. As a result of the threshold, the matrix P is sparse giving really fast computations.

Figure 5:
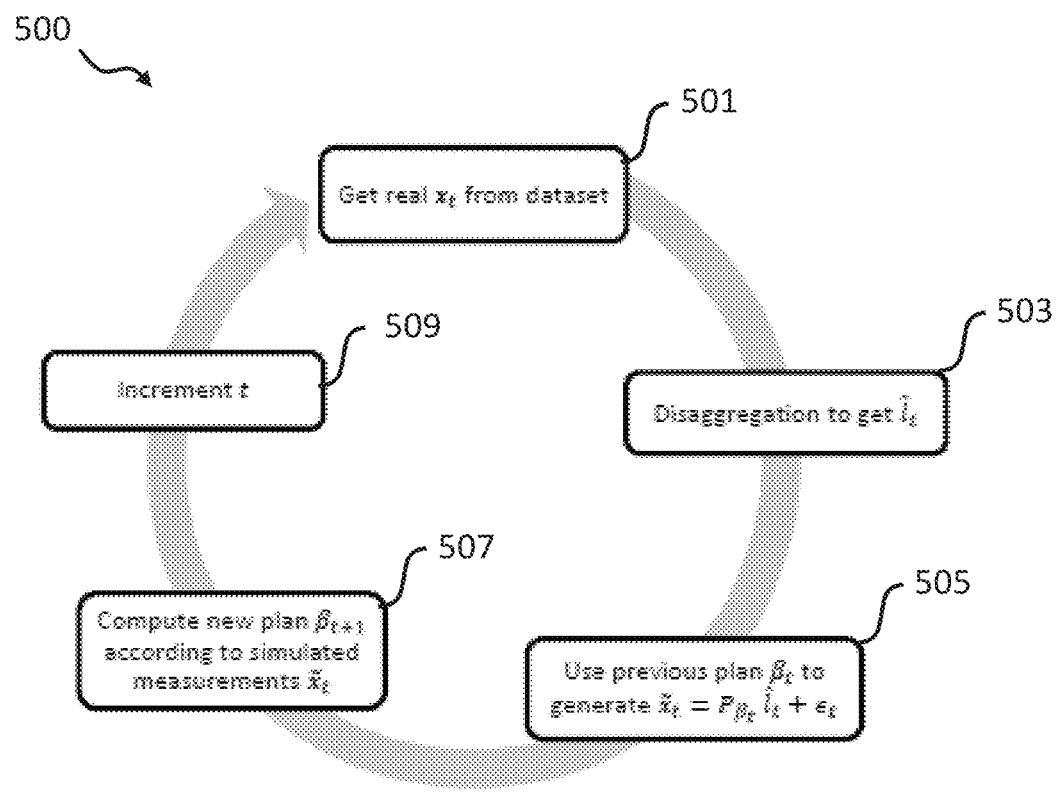
FIG. 5 shows a schematic diagram illustrating different aspects of the network entity according to an embodiment.

At every time step a traffic flow for every ON physical base station 120 has been simulated according to the chosen ON/OFF plan. As illustrated in FIG. 5, the general procedure 500 can proceed as follows:

Get real vector $\hat{x}_t$ from the dataset where all physical base stations 120 are ON (stage 501).

Estimate traffic, i.e. data load $\hat{l}_t$ from the disaggregation model (stage 503).

Use projection $P_{\beta_t}$ to simulate $\tilde{x}_t = P_{\beta_t} \hat{l}_t + \epsilon_t$ as a traffic load on a physical base station 120 according to the plan (stage 505).

Compute best configuration regarding the algorithm to get new plan $\beta_{t+1}$ (stage 507).

Return to stage 501 for the next time step (stage 509).

The added noise $$\epsilon_t \sim \mathcal{N}\left(0, \frac{\sigma}{2}\right)$$

can be computed according to the real world standard deviation $\sigma$.

As already mentioned above, embodiments make use of the L-BFGS-B algorithm and the SciPY implementation. The embodiments based on the network flow model make use of the Golderg-Tarjan algorithm and its implementation in igraph.

As can be taken from the table shown in FIG. 6, which summarizes the results for this example, both approaches (i.e. the optimization approach and the network flow model approach) give two very different kinds of results. The flow approach gives a plan with twice as many physical base stations 120 to switch OFF but the results are so tight to the capacity constraint that it often breaks the wanted QoS. The optimization approach gives a plan with less switched OFF physical base stations but with far more accurate accuracy in the capacities. Both approaches assure a full coverage.

Figure 7:
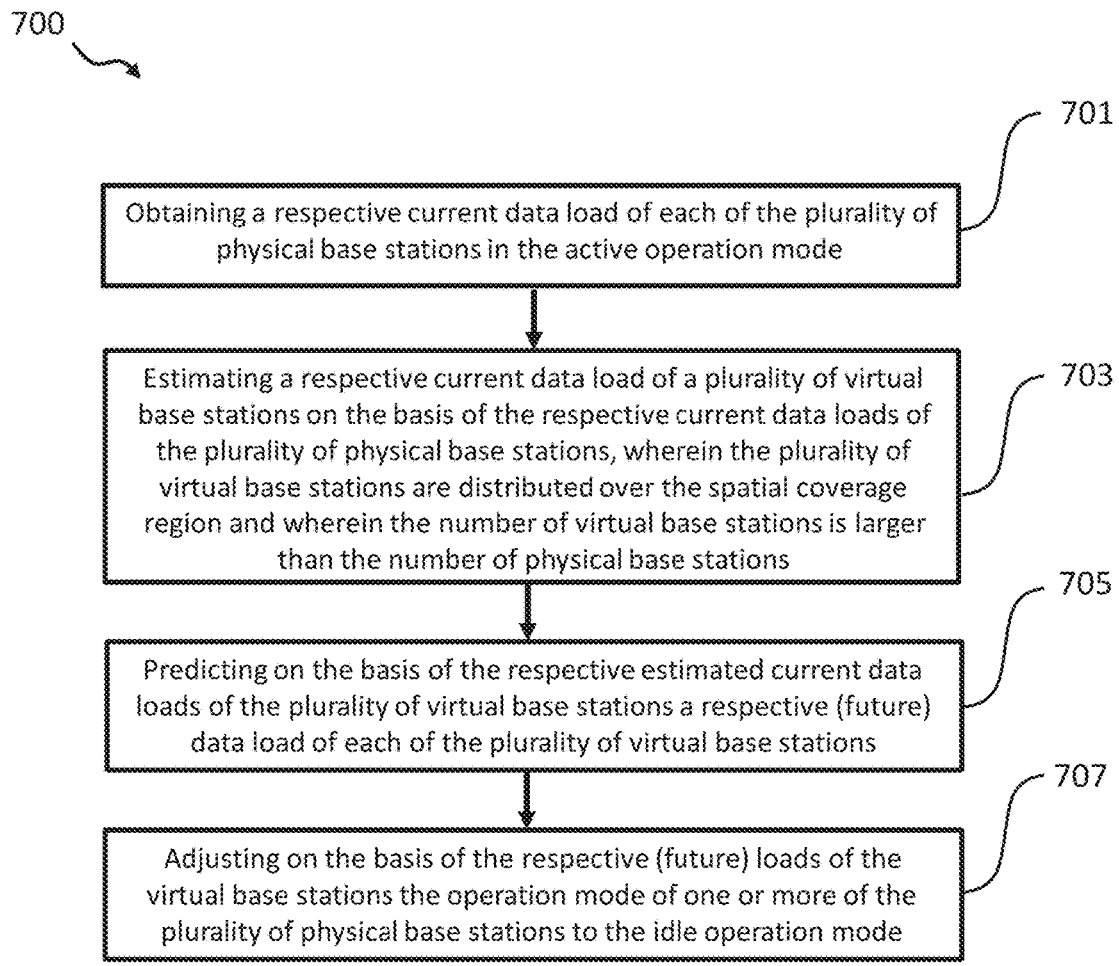
FIG. 7 shows a schematic diagram illustrating a method of controlling the operation mode of a plurality of base stations of a wireless communication network according to an embodiment.

FIG. 7 shows a schematic flow diagram illustrating a corresponding method 700 of controlling the operation mode of the plurality of physical base stations 120 of the wireless communication network 100 according to an embodiment. The method 700 comprises the steps of: (a) obtaining 701 a respective current data load of each of the plurality of physical base stations 120 in the active operation mode; (b) estimating 703 a respective current data load of the plurality of virtual base stations 130 on the basis of the respective current data loads of the plurality of physical base stations 120, wherein the plurality of virtual base stations 130 are distributed over the spatial coverage region 120a and wherein the number of virtual base stations 130 is larger than the number of physical base stations 120; (c) predicting 705 on the basis of the respective estimated current data loads of the plurality of virtual base stations 130 a respective data load of each of the plurality of virtual base stations 130; and (d) adjusting 707 on the basis of the respective loads of the virtual base stations 130 the operation mode of one or more of the plurality of physical base stations 120 to the idle operation mode. As already described in the context of the corresponding network entity 150 steps (a)-(d) can be repeated for a plurality of time steps. By way of example, a time step could be one hour.

While a particular feature or aspect of the disclosure may have been disclosed with respect to only one of several implementations or embodiments, such a feature or aspect may be combined with one or more further features or aspects of the other implementations or embodiments as may be desired or advantageous for any given or particular application. Furthermore, to the extent that the terms "include", "have", "with", or other variants thereof are used in either the detailed description or the claims, such terms are intended to be inclusive in a manner similar to the term "comprise". Also, the terms "exemplary", "for example" and "e.g." are merely meant as an example, rather than the best or optimal. The terms "coupled" and "connected", along with derivatives thereof may have been used. It should be understood that these terms may have been used to indicate that two elements cooperate or interact with each other regardless whether they are in direct physical or electrical contact, or they are not in direct contact with each other.

Although specific aspects have been illustrated and described herein, it will be appreciated that a variety of alternate and/or equivalent implementations may be substituted for the specific aspects shown and described without departing from the scope of the present disclosure. This application is intended to cover any adaptations or variations of the specific aspects discussed herein.

Although the elements in the following claims are recited in a particular sequence with corresponding labeling, unless the claim recitations otherwise imply a particular sequence for implementing some or all of those elements, those elements are not necessarily intended to be limited to being implemented in that particular sequence.

Many alternatives, modifications, and variations will be apparent to those skilled in the art in light of the above teachings. Of course, those skilled in the art readily recognize that there are numerous applications of the invention beyond those described herein. While the present invention has been described with reference to one or more particular embodiments, those skilled in the art recognize that many changes may be made thereto without departing from the scope of the present invention. It is therefore to be understood that within the scope of the appended claims and their equivalents, the invention may be practiced otherwise than as specifically described herein.

What is claimed is:

1. A network entity for controlling a respective operation mode of a plurality of physical base stations of a wireless communication network, wherein the plurality of physical base stations define a spatial coverage region of the wireless communication network and each of the plurality of physical base stations is configured to be operated in an active operation mode or an idle operation mode, the network entity comprising:

processing circuitry configured to:

(a) obtain a respective current data load measurement of each of a plurality of physical base stations operating in the active operation mode;

(b) disaggregate the respective current data load measurements of the plurality of physical base stations operating in the active operation mode to a plurality of virtual base stations by estimating a respective current data load of each of the plurality of virtual base stations based on the respective current data load measurements of the plurality of physical base stations, wherein the plurality of virtual base stations are distributed over the spatial coverage region and wherein a number of virtual base stations is larger than a number of physical base stations;

(c) predict, based on the respective current data load estimates of the plurality of virtual base stations, a respective future data load of each of the plurality of virtual base stations; and (d) adjust, based on the respective future data load predictions of the plurality of virtual base stations, an operation mode of one or more selected physical base stations of the plurality of physical base stations to the idle operation mode, wherein uplink traffic in the wireless communication network flows from the plurality of physical base stations operating in the active operation mode to the plurality of virtual base stations, and wherein downlink traffic in the wireless communication network flows from the plurality of virtual base stations to the plurality of physical base stations operating in the active operation mode.

2. The network entity of claim 1, wherein the network entity further comprises a communication interface configured to send, to the one or more selected physical base stations, a respective operation mode adjustment signal for adjusting, to the idle operation mode, the operation mode of the one or more selected physical base stations.

3. The network entity of claim 1, wherein the processing circuitry is configured to obtain the respective current data load measurements of each of the plurality of physical base stations by receiving information about the current data load of each of the plurality of physical base stations from each of the plurality of physical base stations.

4. The network entity of claim 1, wherein the processing circuitry is configured to estimate the respective current data load of each of the plurality of virtual base stations based on spatial locations of the plurality of physical base stations and spatial locations of the plurality of virtual base stations.

5. The network entity of claim 4, wherein the processing circuitry is configured to estimate the respective current data load of each of the plurality of virtual base stations based on the following equation:

$$x_t = P \cdot l_t,$$

wherein $x_t$ denotes a vector defined by the current data loads of the plurality of physical base stations and $l_t$ denotes a vector defined by the current data loads of the plurality of virtual base stations, and wherein P denotes a projection matrix depending on the spatial locations of the plurality of physical base stations and the spatial locations of the plurality of virtual base stations.

6. The network entity of claim 5, wherein the processing circuitry is configured to predict the respective future data load of each of the plurality of virtual base stations by determining a solution of a minimization problem defined by the following equations:

$$\min_{\forall i, l_{t,i} \geq 0} \; \|P\, l_t - x_t\|^2 + \alpha \sum_{i,j \text{ neighbors}} (l_{t,i} - l_{t,j})^2 + \lambda \|l_t - l_{t-1}\|^2$$

$$\text{s.t.} \; \sum_i l_{t,i} - \sum_k x_{t,k} = 0,$$

wherein $x_t$ is a vector defined by the respective current data loads of the plurality of physical base stations, wherein $x_{t,k}$ is the k-th component of the vector $x_t$ and denotes a respective current data load of the k-th physical base station, wherein $l_t$ is a vector defined by the respective current data loads of the plurality of virtual base stations, wherein $l_{t,i}$ is the i-th component of the vector $l_t$ and denotes a respective current data load of the i-th virtual base station, wherein P denotes a projection matrix dependent on the spatial locations of the plurality of physical base stations and the spatial locations of the plurality of virtual base stations, wherein α denotes a spatial smoothness parameter, and wherein λ denotes a temporal smoothness parameter.

7. The network entity of claim 6, wherein the spatial smoothness parameter α is equal to or larger than 0 and smaller than 20, and/or wherein the temporal smoothness parameter λ is equal to or larger than 0 and smaller than 20.

8. The network entity of claim 5, wherein the processing circuitry is configured to determine the one or more selected physical base stations by determining a solution of a Lasso-like optimization problem defined by the following equations:

$$\min_{\beta \geq 0} \; \kappa \|\beta\|_1 + (\Sigma_i \beta_i \diamond (P\, l_t)_i - \Sigma_j l_j)^2$$

$$\text{s.t.} \; \forall\, j, (^t P \beta)_j > 0$$

$$\forall\, i, \beta_i \cdot (^t P l_t)_i \leq C_i,$$

wherein κ denotes a hyper-parameter of the Lasso-like optimization problem, β denotes a vector associated with the operation mode of each of the plurality of physical base stations and the operator ∘ denotes the pointwise product of vectors.

9. The network entity of claim 1, wherein the processing circuitry is configured to determine the one or more selected physical base stations based on a flow network model comprising a source and a sink, wherein the plurality of virtual base stations are nodes of a first layer of a fully connected graph between the source and the sink and the plurality of physical base stations are nodes of a second layer of the fully connected graph between the source and the sink.

10. The network entity of claim 9, wherein the processing circuitry is configured to determine the one or more selected physical base stations based on a flow network model comprising a source and a sink and further based on a greedy algorithm.

11. The network entity of claim 1, wherein the processing circuitry is further configured to estimate an error value associated with the respective loads of the virtual base stations and to adjust, to the idle operation mode, the operation mode of one or more of the plurality of physical base stations, if the error value is smaller than a threshold value.

12. The network entity of claim 1, wherein the processing circuitry is further configured to repeat (a) to (d) a plurality of times at intervals defined by a time period.

13. The network entity of claim 1, wherein the plurality of virtual base stations utilize physical resources provided by the plurality of physical base stations operating in the active operation mode.

14. A method for controlling a respective operation mode of a plurality of physical base stations of a wireless communication network, wherein the plurality of physical base stations define a spatial coverage region of the wireless communication network and wherein each of the plurality of physical base stations is configured to be operated in an active operation mode or an idle operation mode, the method comprising:

(a) obtaining a respective current data load measurement of each of a plurality of physical base stations operating in the active operation mode;

(b) disaggregating the respective current data load measurements of the plurality of physical base stations operating in the active operation mode to a plurality of virtual base stations by estimating a respective current data load of each of the plurality of virtual base stations based on the respective current data load measurements of the plurality of physical base stations, wherein the plurality of virtual base stations are distributed over the spatial coverage region, and wherein a number of virtual base stations is larger than a number of physical base stations;

(c) predicting, based on the respective current data load estimates of the plurality of virtual base stations, a respective future data load of each of the plurality of virtual base stations; and (d) adjusting, based on the respective future data load predictions of the plurality of virtual base stations, the operation mode of one or more selected physical base stations of the plurality of physical base stations to the idle operation mode, wherein uplink traffic in the wireless communication network flows from the plurality of physical base stations operating in the active operation mode to the plurality of virtual base stations, and wherein downlink traffic in the wireless communication network flows from the plurality of virtual base stations to the plurality of physical base stations operating in the active operation mode.

15. A non-transitory processor readable medium having stored thereon program code configured to, when executed by a computer or a processor, perform the method of claim 14.

16. The method of claim 14, wherein the plurality of virtual base stations utilize physical resources provided by the plurality of physical base stations operating in the active operation mode.

17. A network entity for controlling a respective operation mode of a plurality of physical base stations of a wireless communication network, wherein the plurality of physical base stations define a spatial coverage region of the wireless communication network and each of the plurality of physical base stations is configured to be operated in an active operation mode or an idle operation mode, the network entity comprising:

processing circuitry configured to:
(a) obtain a respective current data load of each of a plurality of physical base stations operating in the active operation mode;
(b) estimate a respective current data load of each of a plurality of virtual base stations based on the respective current data loads of the plurality of physical base stations, wherein the plurality of virtual base stations are distributed over the spatial coverage region and wherein a number of virtual base stations is larger than a number of physical base stations;
(c) predict, based on the estimated respective current data loads of the plurality of virtual base stations, a respective future data load of each of the plurality of virtual base stations; and
(d) adjust, based on the respective future data loads of the plurality of virtual base stations, an operation mode of one or more selected physical base stations of the plurality of physical base stations to the idle operation mode, wherein the processing circuitry is configured to determine the one or more selected physical base stations based on a flow network model comprising a source and a sink, wherein the plurality of virtual base stations are nodes of a first layer of a fully connected graph between the source and the sink and the plurality of physical base stations are nodes of a second layer of the fully connected graph between the source and the sink.

18. The network entity of claim 17, wherein the processing circuitry is configured to determine the one or more selected physical base stations based on a flow network model comprising a source and a sink and further based on a greedy algorithm.

19. The network entity of claim 17, wherein the processing circuitry is configured to obtain the respective current data load of each of the plurality of physical base stations by receiving information about the current data load of each of the plurality of physical base stations from each of the plurality of physical base stations.

20. The network entity of claim 17, wherein the processing circuitry is configured to estimate the respective current data load of each of the plurality of virtual base stations based on spatial locations of the plurality of physical base stations and spatial locations of the plurality of virtual base stations.

* * * * *

UNITED STATES PATENT AND TRADEMARK OFFICE
CERTIFICATE OF CORRECTION

PATENT NO. : 11,412,447 B2
APPLICATION NO. : 16/945016
DATED : August 9, 2022
INVENTOR(S) : Malherbe et al.

It is certified that error appears in the above-identified patent and that said Letters Patent is hereby corrected as shown below:

On the Title Page

Page 2: Item (56) Other Publications, Column 1, Lines 1-5: "González-Brevis et al., "Base Station Location Optimization for Minimal Energy Consumption in Wireless Networks," 2011 IEEE 73rd Vehicular Technology Conference (VTC Spring), Yokohama, Japan, Total 5 pages, Institute of Electrical and Electronics Engineers, New York, New York (May 15-18, 2011)." should be deleted.

Page 2: Item (56) Other Publications, Column 1, Lines 6-9: "Han et al. "Green Radio: Radio Techniques to Enable Energy-Efficient Wireless Networks," IEEE Communications Magazine, vol. 49, No. 6, pp. 46-54, Institute of Electrical and Electronics Engineers, New York, New York (May 2011)." should be deleted.

Page 2: Item (56) Other Publications, Column 1, Lines 10-11: "Csárdi et al., "The igraph software package for complex network research," InterJournal Complex Systems, pp. 1-9, (Nov. 2005)." should be deleted.

In the Claims

Claim 6: Column 14, Line 7: "wherein a denotes a spatial smoothness parameter, and" should read -- wherein $\alpha$ denotes a spatial smoothness parameter, and --.

Claim 8: Column 14, Line 30: "physical base stations and the operator ° denotes the" should read -- physical base stations and the operator $\Diamond$ denotes the --.

Signed and Sealed this
Twentieth Day of December, 2022

*Katherine Kelly Vidal*

Katherine Kelly Vidal
*Director of the United States Patent and Trademark Office*